United States Patent
Hsu et al.

(10) Patent No.: US 7,035,705 B2
(45) Date of Patent: Apr. 25, 2006

(54) SYSTEM AND METHOD FOR PROCESS CONTAMINATION PREVENTION FOR SEMICONDUCTOR MANUFACTURING

(75) Inventors: Chih-Wei Hsu, Chuang-Hua (TW); Span Lu, Hsin-Chu (TW); Kuang-Huan Hsu, Dalin Township, Chiayi County (TW); Chen-Yung Lin, Dayuan Township, Taoyuan County (TW); Shui-Tien Lin, Hsinchu (TW); Chun-Hung Lin, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 10/791,930

(22) Filed: Mar. 3, 2004

(65) Prior Publication Data

US 2005/0197730 A1     Sep. 8, 2005

(51) Int. Cl.
*G06F 19/00* (2006.01)

(52) U.S. Cl. .............................. 700/121; 700/99; 438/5

(58) Field of Classification Search .......... 700/96–100, 700/121; 438/5
See application file for complete search history.

(56) References Cited

U.S. PATENT DOCUMENTS

| | | | |
|---|---|---|---|
| 5,963,911 A * | 10/1999 | Walker et al. ................. | 705/7 |
| 6,349,237 B1 | 2/2002 | Koren et al. | |
| 6,363,294 B1 | 3/2002 | Coronel et al. | |
| 6,408,220 B1 | 6/2002 | Nulman | |
| 6,415,193 B1 | 7/2002 | Betawar et al. | |
| 6,418,351 B1 * | 7/2002 | Martin ....................... | 700/108 |
| 6,449,522 B1 * | 9/2002 | Conboy et al. ............. | 700/121 |
| 6,473,664 B1 | 10/2002 | Lee et al. | |
| 6,505,090 B1 | 1/2003 | Harakawa | |
| 6,546,308 B1 | 4/2003 | Takagi et al. | |
| 6,567,716 B1 * | 5/2003 | Yasuda ....................... | 700/115 |
| 6,732,001 B1 * | 5/2004 | Yamaguchi ................. | 700/109 |
| 6,766,285 B1 * | 7/2004 | Allen et al. .................. | 703/22 |
| 2003/0029383 A1 * | 2/2003 | Ward et al. ................. | 118/719 |
| 2003/0069660 A1 | 4/2003 | Jun et al. | |

* cited by examiner

*Primary Examiner*—Alexander J Kosowski
(74) *Attorney, Agent, or Firm*—Haynes and Boone, LLP

(57) ABSTRACT

Provided are a system and method for preventing contamination in a semiconductor manufacturing environment. The method includes comparing one or more attributes associated with a product, such as a substrate, with one or more attributes associated with an operation. If the comparison indicates that the product is not compatible with the operation, then the operation is suspended with respect to the product. If the comparison indicates that the product is compatible with the operation, then the operation is performed on the product.

17 Claims, 6 Drawing Sheets

SYSTEM AND METHOD FOR PROCESS CONTAMINATION PREVENTION FOR SEMICONDUCTOR MANUFACTURING

BACKGROUND

The present disclosure relates generally to semiconductor manufacturing and, more specifically, to a system and method for preventing product contamination and processing errors during the semiconductor manufacturing process.

An integrated circuit (IC) is formed by creating one or more devices (e.g., circuit components) on a semiconductor substrate using a fabrication process. As fabrication processes and materials improve, semiconductor device geometries have continued to decrease in size over the last several decades ago. For example, current fabrication processes are producing devices having feature sizes (e.g., the smallest component (or line) that can be created using the process) of less than 0.1 µm. However, the reduction in size of device geometries frequently introduces new challenges that need to be overcome.

A semiconductor fabrication facility may operate on a relatively continuous basis with many different manufacturing processes occurring simultaneously. To operate efficiently in this environment, there is a need to automate product identification, product tracking, process status, process control, equipment control, and equipment status.

Accordingly, an improved system and method are needed for tracking and controlling products during semiconductor manufacturing.

DETAILED DESCRIPTION

Figure 1:
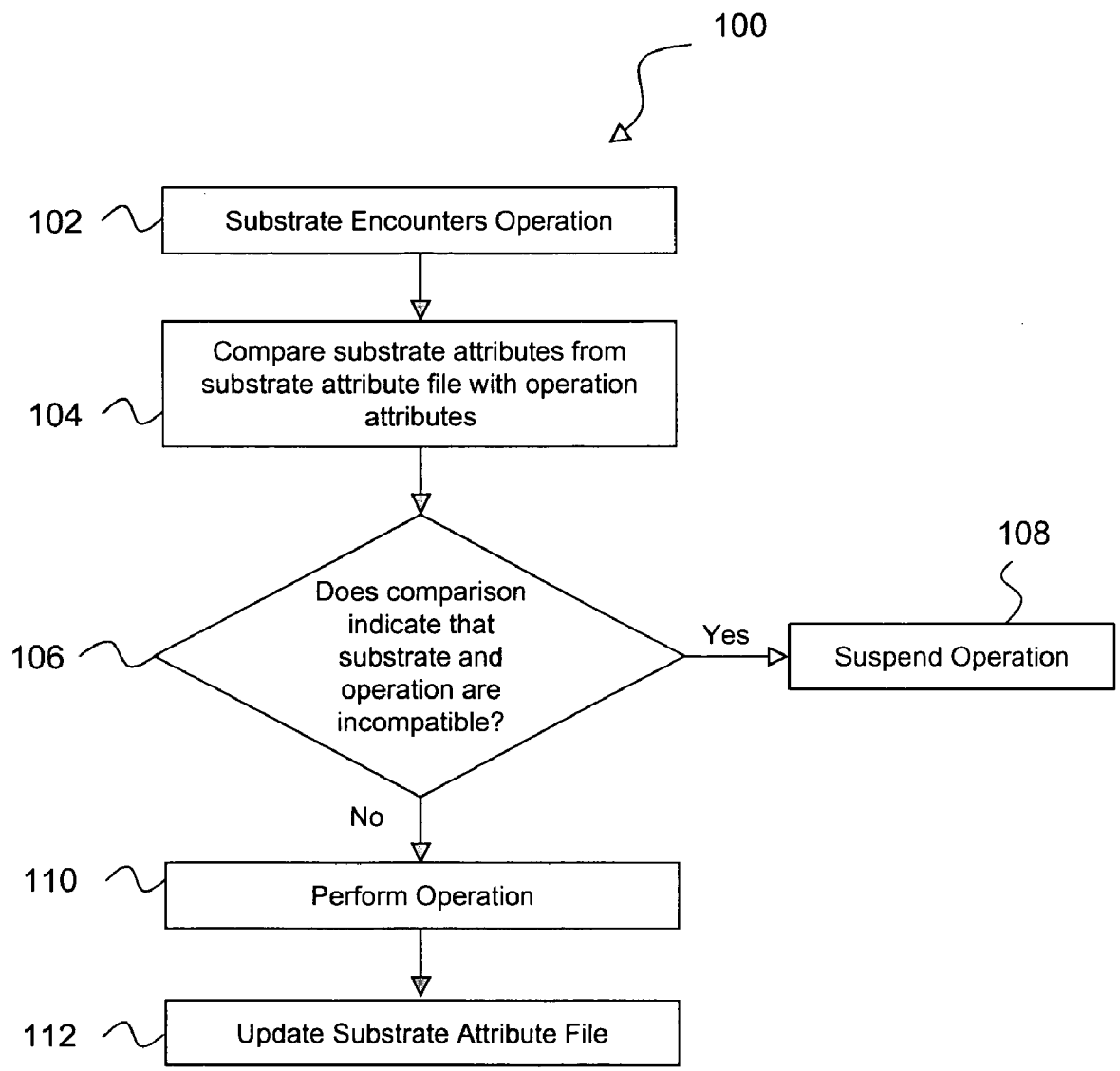
FIG. 1 is a flow chart of one embodiment of a method for minimizing contamination during semiconductor manufacturing.

The present disclosure relates generally to semiconductor manufacturing, and more specifically to a method of preventing product contamination and processing errors during a semiconductor manufacturing process. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a method 100 may be used to prevent product contamination and processing errors during a semiconductor manufacturing process, thereby increasing the efficiency of the manufacturing process. At step 102, a product, which may be a semiconductor substrate such as a silicon wafer, encounters an operation in the manufacturing process. The operation may involve, for example, lot formation, transportation, entering a facility, entering a process area, processing using process equipment, incorporation into inventory, a transfer to a customer, or any other operation that a semiconductor substrate may encounter during the semiconductor manufacturing process.

At steps 104 and 106, before proceeding with the operation, a substrate attribute file (described in detail below) may be compared to operation attributes to determine whether the substrate is associated with an attribute unacceptable to the operation. One example of such an operation and an unacceptable attribute involves metal contamination of a non-metal process. Metal contamination, which may result in device defects, may occur when a product previously processed by a metal process is introduced into a process or to equipment designated for products that do not contain metal. Similarly, another example involves exposing a product that should not be exposed to metal into a metal processing operation or into equipment that has been previously contaminated.

If the determination made in step 106 indicates that the substrate is associated with an attribute unacceptable to the operation, then the method 100 continues to step 108, where the operation is suspended. This suspension may involve removing the substrate from the manufacturing process to avoid delaying other products, requiring that an engineer determine how to handle the substrate, or other predetermined or dynamically selected steps.

If the determination made in step 106 indicates that the substrate is not associated with an attribute unacceptable to the operation, then the operation is performed on the substrate in step 110. In step 112, the substrate attribute file may be updated to indicate that the operation has been performed on the substrate.

Figure 2:
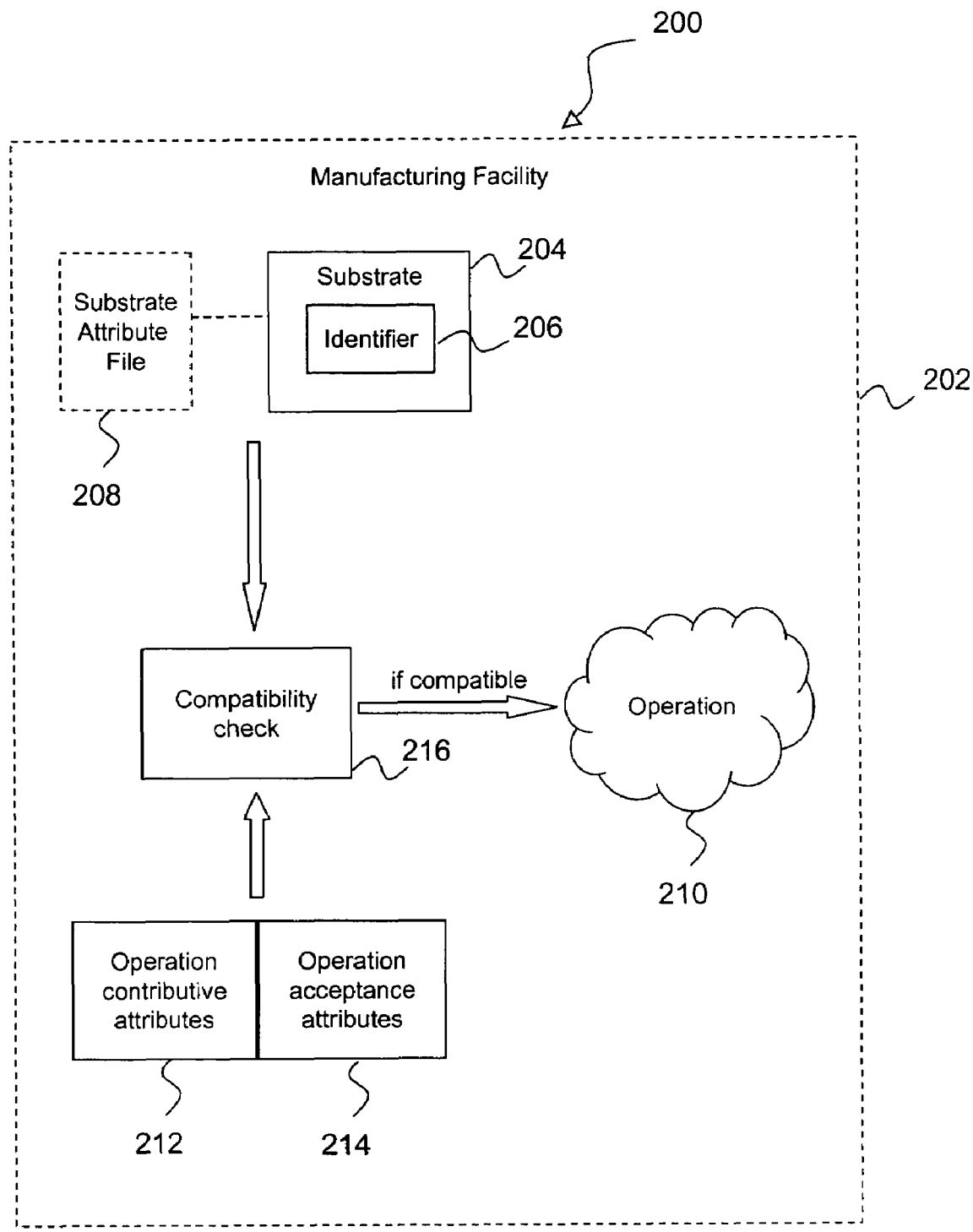
FIG. 2 illustrates an exemplary manufacturing environment in which the method of FIG. 1 may be executed.

Referring now to FIG. 2, an exemplary semiconductor manufacturing facility 202 is to perform operations on a product 204, which is a semiconductor substrate in the present example. In some embodiments, the semiconductor manufacturing facility 202 may comprise all or part of a virtual fab, such as is disclosed in U.S. patent application Ser. No. 10/613,139, filed on Jul. 1, 2003, and hereby incorporated by reference as if reproduced in its entirety. The substrate 204 may be assigned an identifier 206. Although the identifier 206 is assigned to the substrate 204 in the present example, it may be assigned to a particular lot of substrates, to a wafer carrier associated with the substrate, or even to a location on the substrate. The identifier 206 may be a bar code, an alphanumeric code, a 2D matrix code, or any other mark or device which identifies the substrate 204. The identifier 206 may be assigned to a substrate attribute file 208 (described in detail below) that is associated with the substrate 204.

Figure 3:
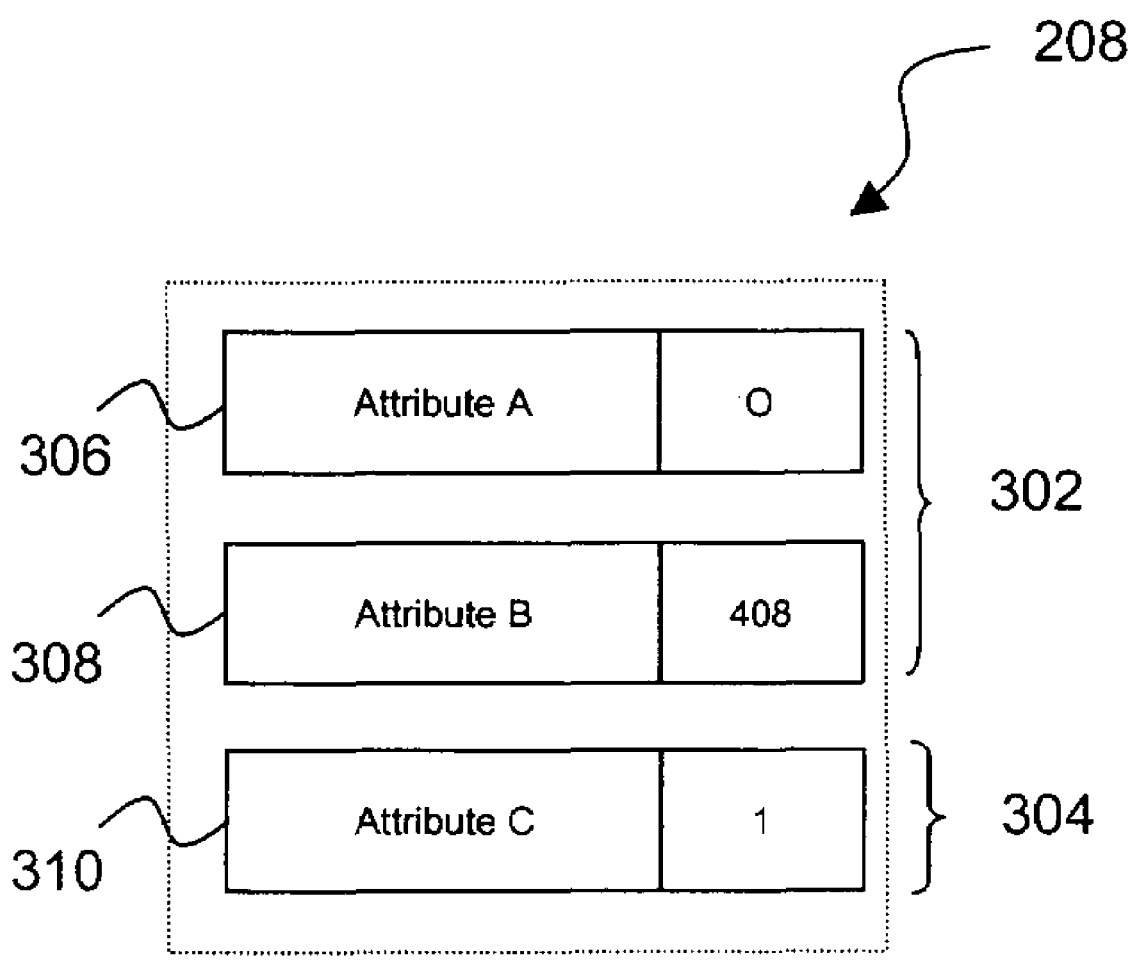
FIG. 3 illustrates an exemplary attribute file which may be used in the manufacturing environment of FIG. 2.

With additional reference to FIG. 3, an exemplary substrate attribute file 208 includes a plurality of attributes, which may include substrate contributive attributes 302 and substrate routing attributes 304. Substrate contributive attributes 302 may represent materials or operations encountered in a semiconductor fabrication process that are associated with the substrate 204. In the present example, the substrate contributive attributes 302 may be binary or continuous. For example, Attribute A (denoted by reference number 306) may represent a metal, and may reflect exposure to the metal by turning a binary character associated with the Attribute A from a 0 to a 1. The substrate 204 associated with the attribute file 208 may then be screened by an operation that restricts substrates which have been exposed to metal. Another attribute, Attribute B (denoted by reference number 308), may be comprise continuous data, such as a duration of time or a quantity of material. The substrate 204 associated with the attribute file 208 may then be screened using Attribute B by an operation that restricts substrates which have a value unacceptable to the operation.

Routing attributes 304 may represent materials, operations, or parameters (e.g., temperature, pressure, etc.) to be avoided by the substrate 204. For example, Attribute C (denoted by reference number 310) may represent a metal, and when a binary character associated with Attribute C is set to 1, the substrate may avoid any operations that comprise an operation contributive attribute (described below) which include the metal. It is understood that additional or fewer attributes may be includes in the substrate attribute file 208. Furthermore, additional fields may be added to an attribute to provide, for example, additional refinement of the compatibility of the substrate 204 with various operations. It is understood that the attributes 302, 304 may also represent the inverse (e.g., the substrate routing attributes 304 may represent materials, operations, or parameters that are compatible with the substrate 204).

Referring again to FIG. 2, one or more operations 210 may be performed on the substrate 204 within the semiconductor manufacturing facility 202. The operation 210 may involve lot formation, during which the substrate 204 may be joined with a collection of other substrates to form a lot. The operation 210 may include entering the substrate 204 into a facility or a process area, or processing the substrate 204 using process equipment such as a wet bench, a furnace, a coater, an etcher, a metrology device, or a metal deposition station. The operation 210 may also include transferring the substrate 204 into inventory, transferring the substrate to a customer, and/or a transporting the substrate between facilities, process areas, or equipment.

The operation 210 may be associated with one or more operation contributive attributes 212 and/or one or more operation acceptance attributes 214. As will be described in greater detail with respect to FIG. 4, the operation contributive attributes 212 and the operation acceptance attributes 214 may be used with one or both of the substrate's contributive attributes 302 and routing attributes 304 during a compatibility check 216. The operation contributive attributes 212 may represent materials or parameters (e.g., pressure, temperature, etc.) that are used in the operation. The operation acceptance attributes 214 may represent materials or parameters that are not compatible with the operation (e.g., that might contaminate or adversely affect the operation). It is understood that the attributes 212, 214 may also represent the inverse (e.g., the operation acceptance attributes 214 may represent materials or parameters that are compatible with the operation).

The compatibility check 216 may be similar to the method 100 of FIG. 1, or may be a different process. The compatibility check 216 may be used to determine whether the substrate 204 is compatible with the operation 210, or whether the operation 210 is compatible with the substrate 204. Furthermore, compatibility may be checked both ways by the compatibility check 216. It is understood that, in some embodiments, the substrate 204 may be compatible with the operation 210 and vice versa if there is no indication of incompatibility or if the incompatibility is below a predefined or dynamically calculated threshold. In addition, the compatibility check 216 may form part of the operation 210, or may be controlled by the operation 210.

It is understood that various hardware and software components may be used to perform the operation 210 and/or the compatibility check 216. The hardware may interface with other hardware within the manufacturing facility 202, as is described in greater detail in previously incorporated U.S. patent application Ser. No. 10/613,139. The hardware may enable the exchange of information between the substrate attribute file 208 and the operation 210, including attribute assignment, identification, and updates. Furthermore, software executed on the hardware may enable, for example, substrate recognition, recipe storage, manufacturing and test step recordation, and substrate attribute file maintenance. The software may be locally executed or may be server-based.

Figure 4:
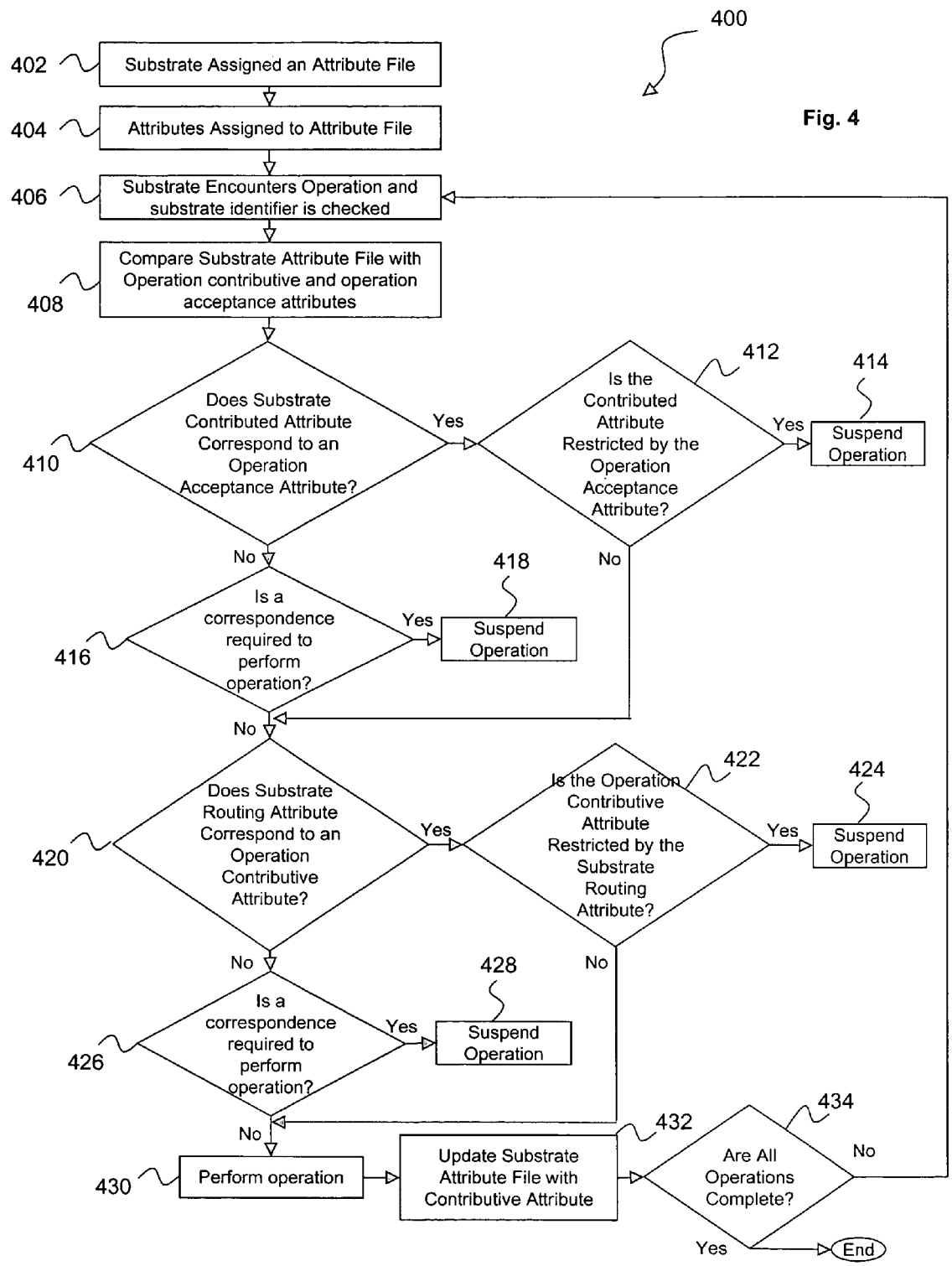
FIG. 4 is a flow chart of another embodiment of a method for minimizing contamination during semiconductor manufacturing that may be executed in the manufacturing environment of FIG. 2.

Referring now to FIG. 4, in another embodiment, a method 400 may be executed during the compatibility check 216 of FIG. 2. In the present example, the method 400 is operable to prevent product contamination and processing errors during a semiconductor manufacturing process involving the substrate 204.

The method 400 begins in step 402 when the substrate 204 is assigned an attribute file, such as the substrate attribute file 208. It is understood that the substrate attribute file 208 may need to be created prior to the assignment. In step 404, before the substrate 204 encounters an operation, substrate contributive attributes 302 and/or substrate routing attributes 304 may be added to the attribute file 208. These attributes may be predefined or may be dynamically generated based on other information associated with the substrate 204. Proceeding to step 406, the substrate 204 encounters an operation, such as the operation 210 of FIG. 2, and an identifier (e.g., the identifier 206 of FIG. 2) is checked to identify the substrate. The compatibility check (which may form part of the operation 210 or may be separate) may then use the identifier 206 to locate and access the substrate attribute file 208 to obtain information about the substrate 204.

In step 408, the substrate attribute file 208 may be compared to the operation contributive attributes 212 and the operation acceptance attributes 214. More specifically, the substrate contributive attributes 302 (e.g., Attribute A and Attribute B of FIG. 3) may be compared with the operation acceptance attributes 214 associated with the operation 210. In addition, the substrate routing attributes 304 (e.g., Attribute C of FIG. 3) may be compared with the operation contributive attributes 212 associated with the operation 210. As will be described below, for some attributes, the identification of a corresponding attribute may be needed to proceed with the operation 210. For other attributes, the identification of a corresponding attribute may result in suspension of the operation 210.

At step 410, a determination is made as to whether the substrate attribute file 208 includes a substrate contributive attribute 302 which corresponds to an operation acceptance attribute 214. If such a correspondence exists, the method 400 continues to step 412. In step 412, a determination is made as to whether the substrate contributive attribute 302 is restricted by the operation acceptance attribute 214. If such a restriction exists, then further operation may be suspended in step 414. If no such restriction exists, then the method 400 continues to step 420. Returning to step 410, if no correspondence exists between the substrate contributive attribute 302 and operation acceptance attribute 214, then the method 400 continues to step 416, where a determination is made as to whether the operation requires a corresponding substrate contributive attribute. If a corresponding attribute is required, then operation may be suspended at step 418. However, if a corresponding attribute is not required, the method 400 may continue to step 420.

At step 420, a determination may be made as to whether the substrate routing attribute 304 corresponds to an operation contributive attribute 212. If such a correspondence exists, then the method 400 proceeds to step 422, where a determination is made as to whether the operation contributive attribute 212 is restricted by the substrate routing attribute 304. If such a restriction exists, then the operation may be suspended at step 424. If no such restriction exists, execution proceeds to step 430. Returning to step 420, if the substrate routing attribute does not correspond to the operation contributive attribute, then a determination is made in step 426 as to whether the substrate attribute file 208 requires a corresponding operation contributive attribute 212. If a corresponding attribute is required, operation may be suspended at step 428. If a corresponding attribute is not required, execution may proceed to step 430.

In step 430, the operation 210 may be performed. The method 400 then continues to step 432, where the substrate attribute file 208 may be updated to record one or more of the operation contributive attributes 212 as substrate contributive attributes 302. This associates the operation contributive attributes 212 with the substrate 204. It is understood that the update of the attribute file 208 may occur at any point before, during, or after the operation is encountered. In some embodiments, the recording of new attributes may trigger the creation of other substrate contributive attributes 302 or substrate routing attributes 304 in the substrate attribute file 208.

At step 434, if it is determined that additional operations are to be performed, the method 400 may return to step 406, where the substrate 204 encounters the next operation. In this next operation, any substrate contributive attributes 302 added to the substrate attribute file 208 in the previous operation may be considered during execution of the method 400. Accordingly, some subsequent operations may reject the updated substrate contributive attributes 302 while others may accept them. After the method 400 ends, the substrate attribute file 208 may be associated with the substrate 204 and any subsequently formed devices which can be traced back to the substrate 204. Furthermore, as previously described, the substrate attribute file 208 may be used until the substrate 204 is delivered to a customer. In some examples, the substrate attribute file 208 may be used by the customer to track later inventory and distribution of the substrate 204.

As one specific example of the method 400, the attribute file 208 may comprise a substrate contributive attribute 302 which indicates that the substrate 204 has encountered copper at some previous stage of a fabrication process. However, the operation encountered at step 406 may be a non-copper wet bench that is associated with an operation acceptance attribute 214 indicating that the operation does not allow substrates containing copper to enter the operation. Accordingly, in step 408, the substrate contributive attribute 302 (e.g., copper) is compared to the operation acceptance attribute 214 (e.g., copper), and a correspondence is found in step 410 (as they are both copper). The method 400 then continues to step 412, where the substrate contributive attribute 302 (e.g., copper) is determined to be restricted by the operation acceptance attribute 214 (e.g., copper). Accordingly, the wet bench operation is suspended with respect to the substrate 204 in step 414.

In another example, the attribute file 208 may comprise a routing attribute 304 indicating that the substrate 204 should not be exposed to cobalt. However, the operation encountered at step 406 may be a silicide process that utilizes cobalt and is thus associated with an operation contributive attribute 212 that indicates cobalt. Accordingly, in step 408, the routing attribute 304 (e.g., no cobalt) is compared to the operation contributive attribute 212. No correspondence is found in step 410, and no correspondence is required in step 416, so execution of the method 400 proceeds to step 420. In step 420, the substrate routing attribute 304 is found to correspond to the operation contributive attribute 212, and the method 400 continues to step 422. In step 422, the operation contributive attribute 212 is determined to be restricted by the substrate routing attribute 304, and the silicide operation is suspended with respect to the substrate 204 in step 428.

In still another example, a substrate 204 may be associated with an attribute file 208 that indicates no substrate contributive attributes 302 or substrate routing attributes 304. In step 406 of the method 400, the substrate 204 encounters a metal operation having an operation contributive attribute 212 that indicates a metal such as AlCu. In step 408, the substrate contributive and routing attributes 302 and 304 are compared to the operation contributive and acceptance attributes 212 and 214. No corresponding attributes are found in steps 410 and 420, and no corresponding attributes are required in steps 416 and 426, so the metal operation is performed in step 430. At step 432, the substrate attribute file 208 is updated to reflect the metal operation by recording an AlCu substrate contributive attribute 302. In the present example, further operations are indicated for substrate 204, and so execution of the method 400 returns to step 406. The substrate 204 encounters a second operation which may be a furnace having an operation acceptance attribute 214 indicating that metal is not accepted by the operation. Accordingly, in step 408, the attributes of the substrate 204 and the operation are compared. As the substrate contributive attribute 302 (e.g., AlCu) is found to correspond with the operation acceptance attribute 214 (e.g., no metal) in step 410, and the substrate contributive attribute 302 is found to be restricted in step 412, then the metal operation is suspended with respect to the substrate 204 in step 314.

In yet another example, a positive correspondence may be required to continue operation. For instance, an operation may only be performed on a substrate 204 if the substrate attribute file 208 includes a substrate contributive attribute 302 indicating that the substrate includes no nickel. However, in step 410, no substrate contributive attribute 302 (e.g., non-nickel) is found to correspond with an operation acceptance attribute 214 indicating non-nickel, and execution proceeds to step 416. In step 416, it is determined that corresponding (non-nickel) attributes are required by the operation, and the operation is suspended with respect to the substrate 204 in step 418.

Accordingly, the method 400 may prevent contamination of both the substrate and the operation. The above described contaminants are merely examples, and other materials, such as photoresist, may be screened using the method 400. Although the method 400 has been described in terms of preventing contamination, it may be used to track a substrate through a process and to provide information about which operations the substrate has encountered by adding an operation contributive attribute 212 for each process. In some embodiments, multiple attributes may be compared in step 408 and screened in steps 410–428. In other embodiments, any of the attributes 212, 214, 302, and/or 304 may be updated by outside intervention, such as by a semiconductor fabrication operator or a process engineer. Furthermore, any of the attributes 212, 214, 302, and/or 304 may be deleted or reset as desired.

As described above, the identifier 206 may be assigned to a particular lot of substrates or wafers, rather than to an individual substrate or wafer. In this embodiment, if the lot is divided into sublots or individual wafers, the contents of the attribute file 208 for the identifier 206 may accompany each divided portion. In situations where one or more lots or wafers are merged into a single lot, the resulting single lot may be associated with an attribute file that comprises each of the attributes contained in the attribute files of the constituent lots or wafers.

Figure 5:
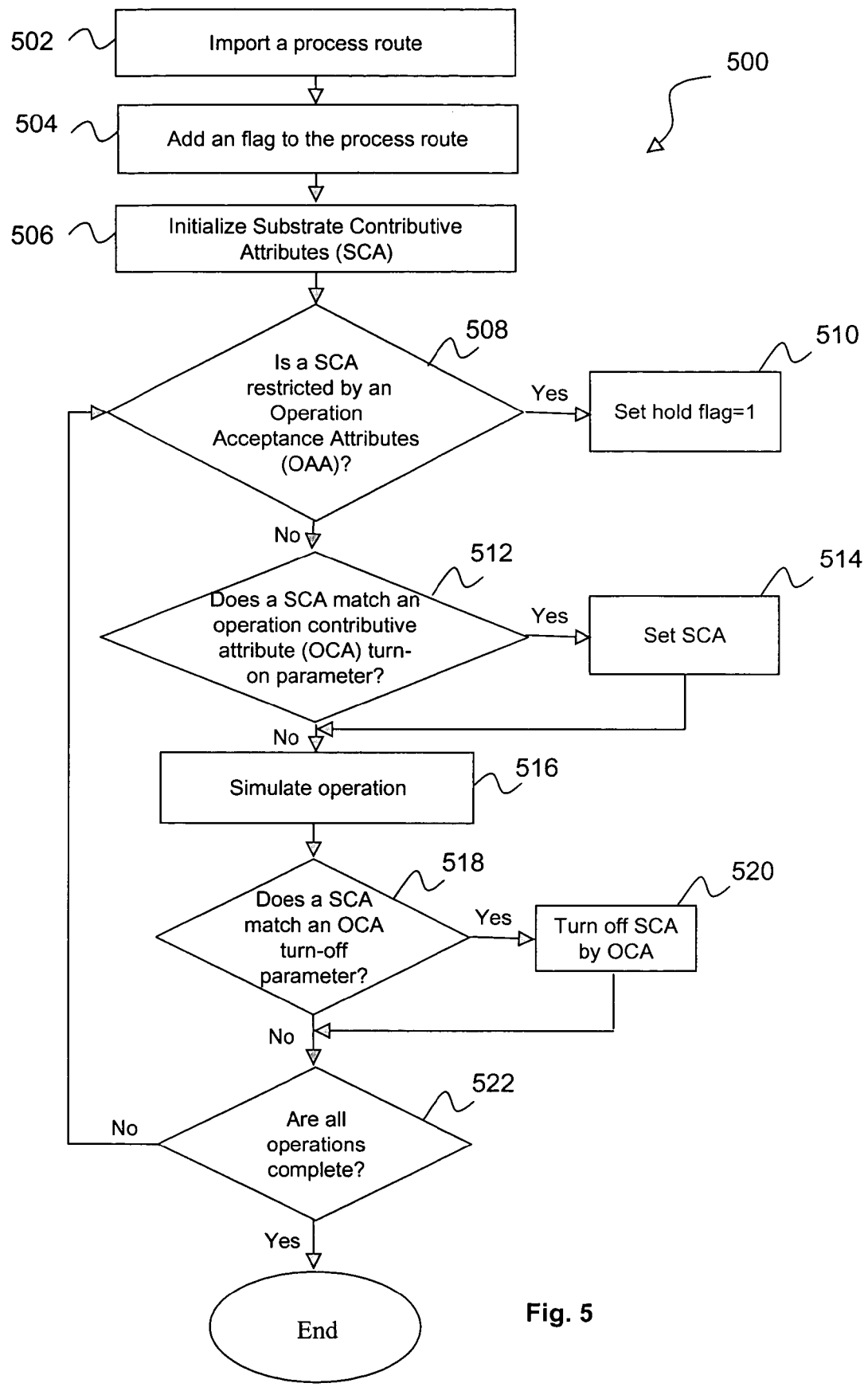
FIG. 5 is a flow chart of a method for simulating a manufacturing process within the manufacturing environment of FIG. 2 to minimize delays from improper product and operation settings.

Referring now to FIG. 5, a method 500 may be used to ensure that attributes are set correctly during an initialization process. For example, when a new operation (or process) step is created, new process equipment is placed for manufacturing, a new product is issued for manufacturing, or both a new product is issued and associated new process equipment is placed for manufacturing, the operation contributive attribute 212 and operation acceptance attribute 214 may need to be created and initialized for each operation, and/or a product attribute file may need to be created and initialized for each new product. In the present example, the method 500 is a simulation executable by one or more computers, but it is understood that the method 500 may be executed in an actual manufacturing environment to test equipment settings and other parameters. The method 500 may be used to reduce the likelihood that a substrate or lot will be held during the manufacturing process due to an incorrect setting.

The method 500 begins in step 502 by importing a process route that defines some or all of the processing steps that will be used to manufacture a product, such as the substrate 204 of FIG. 2. The substrate 204 is associated with the process route during the processing steps. The process route may include relevant information for each process step, such as a process ID, a process recipe ID, applicable process equipment, and various process parameters (e.g., temperature, pressure, light wavelength, duration, etc.). The process route may also include substrate contributive attributes 302 and substrate routing attributes 304 as previously described for preventing contamination of the substrate and/or equipment. Exemplary parameters for the substrate contributive attributes 302 and the substrate routing attributes 304 will be described in FIG. 6.

Figure 6:
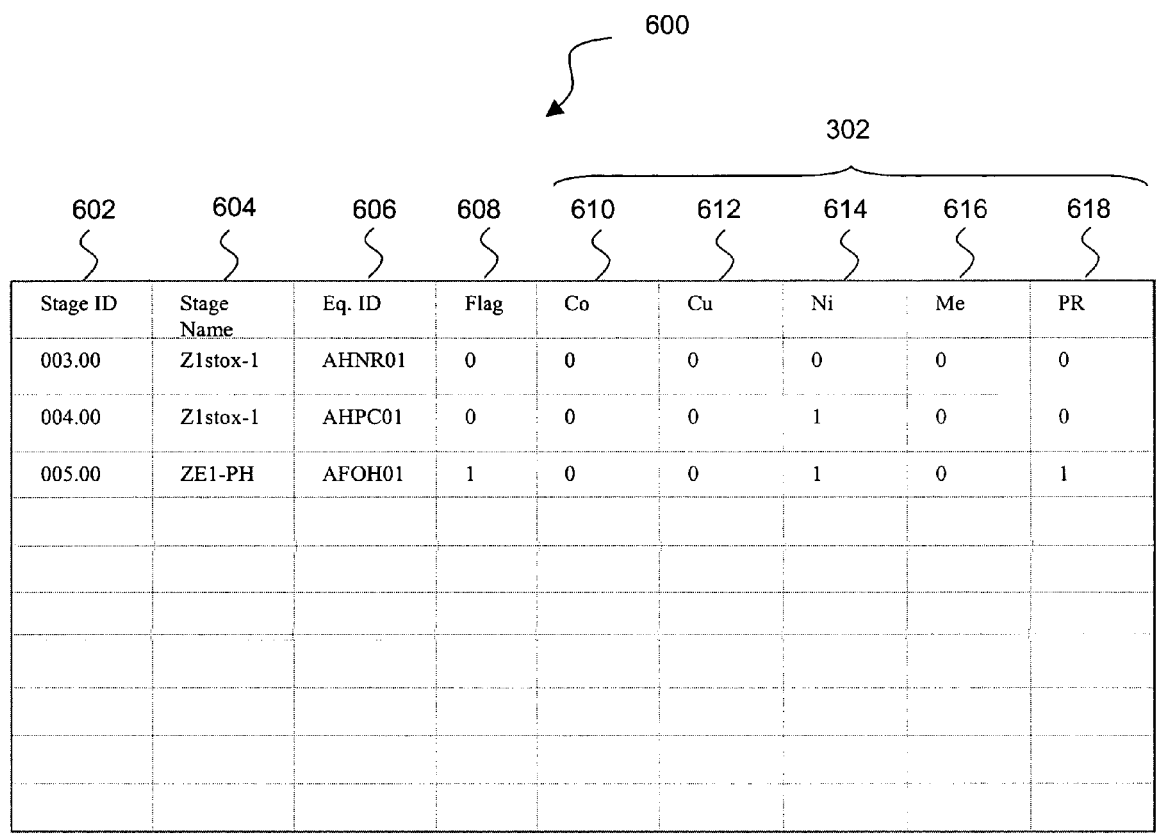
FIG. 6 illustrates an exemplary attribute chart that may be used with the method of FIG. 5.

With additional reference to FIG. 6, a chart 600 includes a field 602 (e.g., a process stage ID), a stage name 604, an equipment ID 606, a flag 608, and various substrate contributive attributes, such as the substrate contributive attributes 302 of FIG. 3. In the present example, the substrate contributive attributes 302 include cobalt 610, copper 612, nickel 614, other metals 616, and photoresist 618. In the process route, each operation (or process) stage (or step) has a corresponding set of parameters as illustrated by the chart 600.

Referring again to FIG. 5, in step 504, the flag 608 is added to the process route. In the present example, the flag 608 is represented by binary data as either 0 or 1. When the flag is set to '1', a user (which may be a person or an automated process) may be alerted to verify the settings of the chart 600. For example, the operation contributive attributes 212 and the operation acceptance attributes 214 may need to be verified for a new operation, or the substrate contributive attributes 302 and the substrate routing attributes 304 may need to be verified for a new product. Accordingly, when the flag 608 indicates that verification is needed, a user may make changes to various attributes and then restart the simulation represented by the method 500. In this manner, the various attributes may be adjusted prior to the execution of an actual manufacturing process.

In step 506, before an operation occurs, a substrate attribute file (e.g., the substrate attribute file 208 of FIG. 2) is created and initialized with one or more substrate contributive attributes 302 and/or one or more substrate routing attributes 304. In the present example, the substrate attribute file 208 comprises the substrate contributive attributes 302 shown in FIG. 6 and described above. Each contributive attribute 610, 612, 614, 616, and 618 is associated with one type of contamination and may be associated with a binary data field (e.g., 0 or 1). For example, the contributive attribute 612 represents copper. Accordingly, the contributive attribute 612 may reflect exposure to copper by changing a binary character associated with the contributive attribute 612 from a 0 to a 1 (or vice versa). The substrate 204 may then be screened by an operation that restricts substrates that have been exposed to copper.

One example of an entry (or entries) in the substrate attribute file 208 is "01001", with each binary digit corresponding to one of the five contributive attributes 610, 612, 614, 616, and 618, respectively. The substrate contributive attributes may be different after each further operation (or process). For example, the contributive attributes may initially be set to "00000", which might represent a new, contamination-free substrate prior to processing.

In step 508, one or more of the contributive attributes 610, 612, 614, 616, and 618 are compared with one or more operation acceptance attributes 214. If the contributive attribute is restricted by the operation acceptance attribute 214 in one operation step (or stage), the method 500 continues to step 510, where the flag 608 is set to indicate that verification and/or modification is needed with respect to one or more of the attributes. For example, if the contributive attributes for the substrate 204 at this stage (or step) are "00100" (Stage ID 04.00 of FIG. 6), then the substrate 204 is nickel contaminated. Similarly, if the operation acceptance attributes are set at "01100", then the operation restricts any substrate contaminated by copper and/or nickel. Accordingly, the process route may not be correct for this combination of substrate and operation, and the flag 608 will be set to indicate that verification and/or modification is needed. It is understood that the flag 608 may be set at any time during the method 500. As stated previously, the method 500 may be used to reduce the likelihood that a substrate or lot will be held during the manufacturing process due to an incorrect setting.

If no flag is raised, the method 500 continues to step 512, where one or more of the contributive attributes 610, 612, 614, 616, and 618 are compared with one or more operation contributive attributes 212. In the current embodiment, each operation acceptance attribute 214 may take a discrete value, such as 0, 1, or 2. For example, a '0' may represent an operation that is free from contamination and that will not impact a substrate processed by the operation. A '1' may represent a contaminated operation that will contaminate a substrate processed by the operation. A '2' may represent an operation that is not only free from contamination, but one that will also clean a previously contaminated substrate. The comparison of step 512 determines whether any of the contributive attributes 610, 612, 614, 616, and 618 will be "turned on" (e.g., set to '1' to indicate that the operation will contaminate the substrate 204 by one of the attribute types (e.g., copper, nickel, etc.)).

If it is determined that such contamination will occur, then method 500 continues to step 514, where a relevant contributive attribute 610, 612, 614, 616, and 618 is updated. For example, a contributive attribute setting of "00000" may be updated to "01000" by a operation contributive attribute setting of "01000," indicating that the substrate is copper contaminated by the operation. After the update, or if no match is found, then the method 500 continues to step 516, where the operation may be simulated. It is understood that such a simulation may not be needed, or may be used to verify such settings as temperature, pressure, etc., of the particular operation.

In step 518, the contributive attributes 610, 612, 614, 616, and 618 are compared with the operation contributive attributes 212 after the operation is complete. If the comparison indicates that any of the contributive attributes need to be "turned off" (e.g., set to 0) to indicate, for example, that the substrate 204 is free of a particular type of contamination, then the method 500 continues to step 520 where the relevant attribute is set. For example, the substrate attribute file settings may be changed from "01010" to "01000" by an operation contributive attribute setting of "01020." In step 522, a determination is made as to whether other operations remain to be simulated. If so, the method 500 returns to step 508. If not, the method 500 ends and the process route may be implemented in the manufacturing facility.

The present disclosure has been described relative to a preferred embodiment. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the disclosure will be employed without a corresponding use of other features. For example, in the previously described methods, it is understood that steps may be removed, added, or performed in a different order. Accordingly, it is appropriate that the appended claims be construed broadly in a manner consistent with the scope of the disclosure.

What is claimed is:

1. A method for preventing contamination during a manufacturing operation of a semiconductor product, wherein the product is associated with at least one product contributive attribute indicating a property of the product, and wherein the operation is associated with at least one operation acceptance attribute indicating a property of the operation, the method comprising:
   creating an attribute file containing the product contributive attribute and associating the product contributive attribute with the product by assigning the attribute file to the product;
   comparing the product contributive attribute and the operation acceptance attribute prior to performing the operation on the product, wherein the operation acceptance attribute identifies contaminants unacceptable to the operation;
   determining whether the comparison indicates that the product is not compatible with the operation;
   performing the operation if the product and operation are compatible; and
   suspending the operation if the product and operation are not compatible.

2. The method of claim 1 further comprising identifying a correspondence between the product contributive attribute and the operation acceptance attribute, wherein the suspension of the operation is in response to the identification of the correspondence between the product contributive attribute and the operation acceptance attribute.

3. The method of claim 1 wherein comparing the product contributive attribute and the operation acceptance attribute identifies no correspondence.

4. The method of claim 1 wherein the product contributive attribute provides information about a prior operation encountered by the product.

5. The method of claim 1 wherein the product is also associated with at least one product routing attribute, and wherein the operation is associated with at least one operation contributive attribute, the method further comprising comparing the product routing attribute and the operation contributive attribute.

6. The method of claim 5 further comprising indetifying a correspondence between the product routing attribute and the operation contributive attribute, wherein suspending the operation is in response to the identification of the correspondence between the product routing attribute and the operation contributive attribute.

7. The method of claim 5 wherein comparing the product routing attribute and the operation contributive attribute identifies no correspondence.

8. The method of claim 1 further comprising:
   performing an intermediate operation; and
   altering the product attribute file associated with the product in response to performing the intermediate operation, wherein the suspension of the operation is responsive to the altered product attribute file.

9. The method of claim 1 wherein the at least one product contributive attribute indicates a metal.

10. The method of claim 1 wherein the product is associated with an identifier and wherein the operation retrieves the product contributive attribute based on the identifier.

11. A method for preventing contamination during a substrate manufacturing operation, wherein the operation is associated with at least one operation acceptance attribute indicating a property not acceptable to the operation, and wherein a substrate is associated with at least one substrate contributive attribute indicating a property currently associated with the substrate, the method comprising:
   determining if the substrate contributive attribute corresponds to the operation acceptance attribute;
   if the substrate contributive attribute corresponds to the operation acceptance attribute, determining if the operation acceptance attribute restricts the substrate contributive attribute;
   if the operation acceptance attribute restricts the substrate contributive attribute, suspending the operation with respect to the substrate; and
   determining if a substrate routing attribute associated with the substrate corresponds to an operation contributive element associated with the operation, wherein the substrate routing attribute indicates a material not acceptable to the substrate, and wherein the operation contributive attribute indicates a material used in the operation.

12. The method of claim 11 further comprising:
   if the substrate contributive attribute does not correspond to the operation acceptance attribute, determining if a correspondence is required to perform the operation; and
   if a correspondence is required, suspending the operation with respect to the substrate.

13. The method of claim 11 further comprising:
assigning a substrate attribute file to the substrate, wherein the substrate attribute file includes at least one of the substrate contributive attribute and the substrate routing attribute;
performing the operation; and
updating the substrate attribute file using the operation contributive attribute after performing the operation.

14. The method of claim 11 further comprising setting a flag to indicate that validation is needed for at least one of the substrate contributive attribute and the operation acceptance attribute.

15. A method for preventing contamination during a substrate manufacturing operation, wherein the operation is associated with at least one operation acceptance attribute indicating a property not acceptable to the operation, and wherein a substrate is associated with at least one substrate contributive attribute indicating a property currently associated with the substrate, the method comprising:
determining if the substrate contributive attribute corresponds to the operation acceptance attribute;
if the substrate contributive attribute corresponds to the operation acceptance attribute, determining if the operation acceptance attribute restricts the substrate contributive attribute;
if the operation acceptance attribute restricts the substrate contributive attribute, suspending the operation with respect to the substrate;
if the substrate contributive attribute does not correspond to the operation acceptance attribute, determining if a correspondence is required to perform the operation;
if a correspondence is required, suspending the operation with respect to the substrate; and
determining if a substrate routing attribute associated with the substrate corresponds to an operation contributive element associated with the operation, wherein the substrate routing attribute indicates a material not acceptable to the substrate, and wherein the operation contributive attribute indicates a material used in the operation.

16. The method of claim 15 further comprising:
if the substrate routing attribute corresponds to the operation contributive attribute, determining if the substrate routing attribute restricts the operation contributive attribute; and
if the substrate routing attribute restricts the operation contributive attribute, suspending the operation with respect to the substrate.

17. The method of claim 16 further comprising:
if the substrate routing attribute does not correspond to the operation contributive attribute, determining if a correspondence is required to perform the operation;
if a correspondence is required, suspending the operation with respect to the substrate; and
if a correspondence is not required, performing the operation on the substrate.

* * * * *